US012067390B2

(12) United States Patent
Huang et al.

(10) Patent No.: US 12,067,390 B2
(45) Date of Patent: Aug. 20, 2024

(54) OVER-THE-AIR FIRMWARE UPDATES FOR DUAL-MODE INTERNET OF THINGS DEVICES

(71) Applicant: Verizon Patent and Licensing Inc., Arlington, VA (US)

(72) Inventors: Ye Huang, San Ramon, CA (US); Sagiv Draznin, Walnut Creek, CA (US); Jeremy Nacer, Denville, NJ (US); Gulay Kurt Chrzanowski, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 424 days.

(21) Appl. No.: 16/459,735

(22) Filed: Jul. 2, 2019

(65) Prior Publication Data

US 2021/0004222 A1 Jan. 7, 2021

(51) Int. Cl.

| | |
|---|---|
| ***G06F 9/44*** | (2018.01) |
| ***G06F 8/656*** | (2018.01) |
| ***H04L 65/80*** | (2022.01) |
| ***H04L 67/02*** | (2022.01) |
| ***H04L 67/06*** | (2022.01) |

(52) U.S. Cl.
CPC .............. *G06F 8/656* (2018.02); *H04L 65/80* (2013.01); *H04L 67/02* (2013.01); *H04L 67/06* (2013.01)

(58) Field of Classification Search
CPC ......... G06F 8/656; H04L 65/80; H04L 67/02; H04L 67/06
See application file for complete search history.

(56) References Cited

U.S. PATENT DOCUMENTS

2013/0114497 A1* 5/2013 Zhang ..................... H04W 4/06 370/312
2017/0201979 A1* 7/2017 Murphy .................. H04L 63/10
2017/0257341 A1* 9/2017 Arsenault ........... H04L 61/6004
2017/0364346 A1* 12/2017 Peng .................. G06F 13/4068
2018/0213444 A1* 7/2018 Khawand .......... H04W 28/0268
2018/0219784 A1* 8/2018 Jiang ................... H04M 15/853
2019/0069199 A1* 2/2019 Yan ....................... H04W 28/12
2019/0102164 A1* 4/2019 Gur ......................... H04L 67/34
2019/0166016 A1* 5/2019 Livanos ................ H04L 67/322
2019/0250899 A1* 8/2019 Riedl .................... H04L 9/0825
2019/0324737 A1* 10/2019 Patil ........................ H04L 45/02
2019/0349858 A1* 11/2019 Jantzi ................ H04W 52/0235
2019/0357214 A1* 11/2019 Kurian .................. H04W 16/10
2019/0373649 A1* 12/2019 Magadevan ........... H04W 4/70

* cited by examiner

*Primary Examiner* — Chat C Do
*Assistant Examiner* — Lenin Paulino

(57) ABSTRACT

A system may receive a request to perform a firmware update on an Internet of Things (IoT) device and determine whether the IoT device is capable of switching from a first mode to a second mode. The IoT device sends and receives data via first channels when the IoT device is operating in the first mode and the IoT device sends and receives data via second channels when the IoT device is operating in the second mode. The system instructs the IoT device to switch to the second mode in response to determining that the IoT device is capable of switching to the second mode and sends the firmware update to the IoT device while the IoT device is in the second mode. The system determines that the firmware update has been completed and instructs the IoT device to switch from the second mode to the first mode when the firmware update has been completed.

20 Claims, 7 Drawing Sheets

OVER-THE-AIR FIRMWARE UPDATES FOR DUAL-MODE INTERNET OF THINGS DEVICES

BACKGROUND INFORMATION

As the popularity of Internet of Things (IoT) devices increases, a burden is placed on wireless access networks to manage the IoT devices and other user devices associated with the wireless access network. In particular, upgrading the firmware associated with the IoT devices may strain the resources of a wireless access network. A wireless access network must balance the need to perform necessary firmware updates for the IoT devices while managing traffic associated with other user devices without overloading the wireless access network.

DETAILED DESCRIPTION OF PREFERRED EMBODIMENTS

Figure 1:
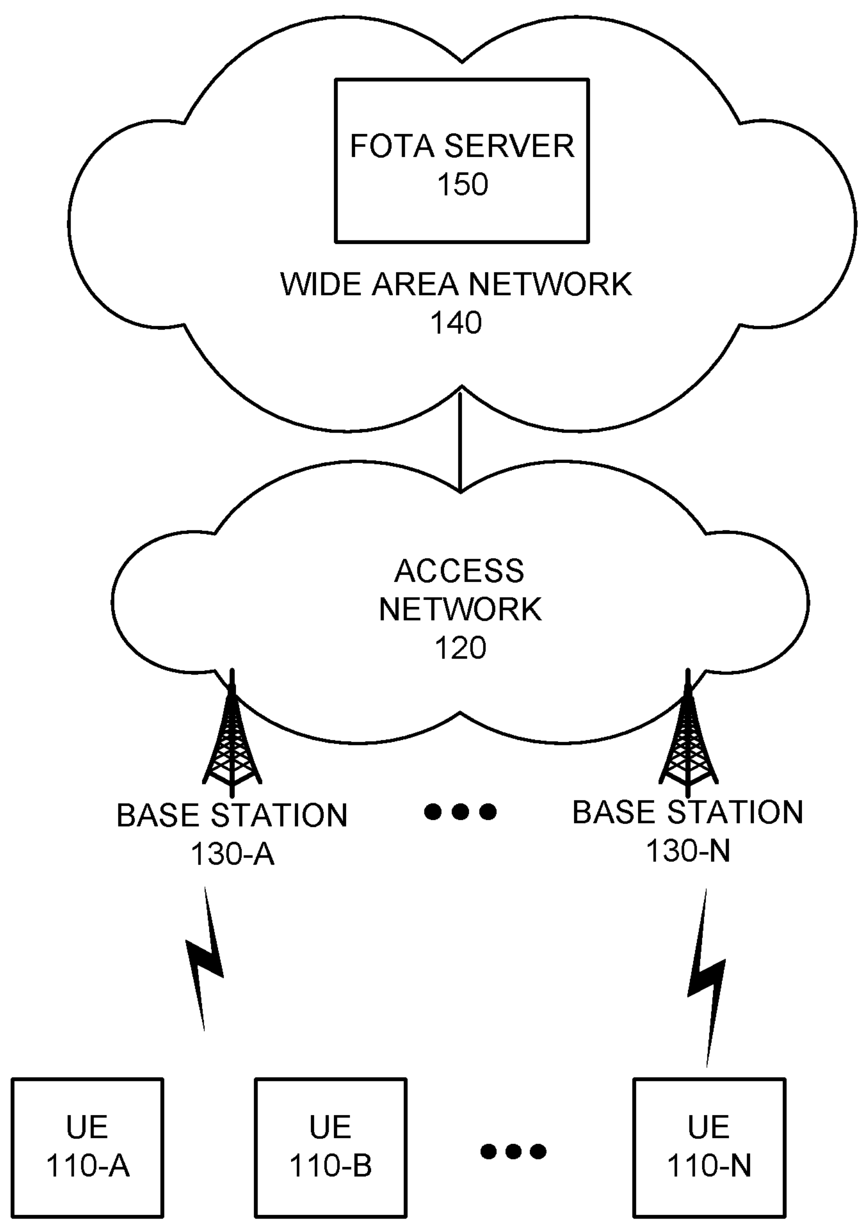
FIG. 1 is a diagram illustrating an exemplary network environment consistent with an embodiment.

The following detailed description refers to the accompanying drawings. The same reference numbers in different drawings identify the same or similar elements.

Wireless access networks are traditionally designed to support mobile devices, such as smart phones, however, an increasing number of Internet of Things (IoT) applications have led to a growing number of IoT devices employing machine-to-machine (M2M) communication, such as Machine-Type Communication (MTC). An IoT device may be configured to communicate with other devices without requiring explicit user interaction. IoT devices may have a wide variety of uses, ranging from stationary uses such as utility meters, environmental sensors, parking meters and/or occupancy sensors, security sensors, smart lighting, traffic cameras, advertising displays, point-of-sale terminals, vending machines, remote diagnostics devices, power grid sensors and/or management devices, to high speed autonomous vehicles and aerial drones.

Uses of IoT devices are envisioned to increase exponentially and may result in a large number of such devices being serviced by a wireless access network. Estimates indicate that the number of IoT devices within a wireless operator's network may increase to hundreds of millions of devices communicating with each other autonomously with little to no human intervention. Thus, a provider of wireless communication services may manage wireless access networks that include a large number of IoT devices.

A wireless network, such as a Fourth Generation (4G) Long Term Evolution (LTE) access network (e.g., an evolved packet core (EPC) network), may use the Evolved Universal Terrestrial Radio Access (E-UTRA) air interface to wirelessly communicate with devices. The bandwidth of an E-UTRA channel in an LTE band may range from about 1.4 to about 20 Megahertz (MHz). In many applications, the data sent or received by IoT devices may be small compared to other types of devices, such as mobile phones used for voice communication or for streaming content. Furthermore, many IoT devices are designed for low power applications and long battery life. Therefore, use of large bandwidth channels that use large amounts of power, such as an LTE channel, for wirelessly communicating with IoT device may be an inefficient use of radio link resources.

A technology developed for IoT applications that does not require large amounts of data and that is based on a Low Power Wide Area Network (LPWAN) design is LTE Category M1 (CAT-M1). CAT-M1 channels, also sometimes referred to as enhanced MTC (eMTC) channels, use a total bandwidth of about 1.4 MHz and have a very low power requirement compared to an LTE channel. Another technology developed for IoT applications that does not require large amounts of data or power, is the Narrow Band (NB) IoT (NB-IoT) technology. NB-IoT is an LPWAN technology that uses 200 Kilohertz (KHz) channels, with their own guard bands, for sending small amounts of data. The use of NB-IoT channels may result in better signal penetration in hard to reach areas, such as areas likely to be occupied by IoT devices (e.g., a utility meter installed in a location that shadows or fades wireless signals). Furthermore, the use of NB-IoT channels may result in lower energy consumption and/or cheaper component cost.

An IoT device may need to perform a wireless update, also referred to as an Over-the-Air (OTA) update. One particular type of OTA update that may include the transfer of a large file may be a firmware OTA (FOTA) update. Other types of OTA updates that may include the transfer of a large file may be a baseband OTA update or an application software OTA update. The firmware of an IoT device may control the low-level operation of the hardware of an IoT device and may need to be periodically updated. When an original equipment manufacturer (OEM) or another type of entity decides to add a new functionality to, or fix a potential security flaw in one or more IoT devices, the resources of a base station may be overwhelmed due to the thousands and potentially millions of devices that will require the update.

Currently, when performing a FOTA update, data packets may traverse the gateway user plane and be routed to an IoT device via a Mobility Management Entity (MME) or an Access and Mobility Function (AMF). This control plane-based approach may consume significant resources between the base station and the IoT devices. Performing a firmware update may overload the control plane and cause cell site congestion. Because the control plane may be used for mobility management for critical services, it may be undesirable to overload the control plane for firmware updates.

In addition, subscribers to a wireless access network may subscribe to a data plan that allows a particular amount of data usage per month. Because the size of a firmware update can be large, frequent FOTA updates may cause subscribers to use more data than is allocated to them in a particular time period. In these cases, a subscriber may be charged for additional data usage. Alternatively, a subscriber may be forced to upgrade to a larger data plan in order to accommodate the data used during the firmware updates. This may cause subscribers to pay more for a data plan than they had previously paid and may further cause customer dissatisfaction with the wireless access network.

Implementations described herein relate to a dual mode IoT device (e.g., NB-IoT/CAT-M1) that may switch to between modes for performing FOTA updates. In an embodiment, an IoT device may remain in a NB-IoT mode, in which the IoT device sends and receives data via NB-IoT channels, during normal operations and may switch to CAT-M1 mode, in which data is exchanged via CAT-M1 channels, for performing a FOTA update. Because some IoT devices may transmit only a small amount of data on a daily basis, the NB-IoT mode may be suitable for daily operations. Maintaining the IoT device in a NB-IoT mode for daily operations may limit the resources used by the wireless access network. However, when FOTA updates are required, the IoT device may switch to the CAT-M1 mode, for example, which uses higher bandwidth channels. In this way, the IoT device may receive the FOTA updates periodically (e.g., once a week, month or several times a year) without causing a customer to experience data over usage and without causing a resource burden on the wireless access network.

Implementations described herein may limit a customer to certain maximum file sizes for FOTA updates. The maximum file size may be defined in Device Technology requirements published to device vendors. Additionally, NB-IoT devices that are capable of switching to CAT-M1 mode may be required to use CAT-M1 mode for FOTA. The NB-IoT devices may be required to remain in NB-IoT mode and may only switch to CAT-M1 mode for FOTA updates. The NB-IoT devices may be restricted from switching to CAT-M1 mode for any reason other than performing the FOTA update. The wireless access network may enforce this restriction. Furthermore, the wireless access network may warn and/or prohibit performing a FOTA update when the IoT device is roaming and/or in coverage enhancement (CE) mode.

FIG. 1 is a diagram illustrating an exemplary network environment 100 consistent with an embodiment. As shown in FIG. 1, environment 100 may include endpoint user equipment devices (UEs) 110-A to 110-N (referred to herein collectively as "UEs 110" and individually as "UE 110"), an access network 120, a wide area network (WAN) 140, and an FOTA server 150.

UEs 110 may include any device with (e.g., cellular or mobile wireless network) wireless communication functionality. For example, UEs 110 may communicate using M2M communication, such as MTC. For example, UE 110 may include a utility meter (e.g., electricity meter, water meter, gas meter, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), health monitoring device (e.g., a blood pressure monitoring device, a blood glucose monitoring device, etc.), and/or another type of electronic device.

In other implementations, UE 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and/or a user interface.

Access network 120 may provide access to WAN 140 for UEs 110. Access network 120 may enable UEs 110 to connect to WAN 140 for Internet Protocol (IP) services and/or non-IP data delivery (NIDD) services, mobile telephone service, Short Message Service (SMS), Multimedia Message Service (MMS), multimedia broadcast multicast service (MBMS), Internet access, cloud computing, and/or other types of data services.

Access network 120 may establish or may be incorporated into a packet data network connection between UE 110 and WAN 140 via one or more Access Point Names (APNs). For example, access network 120 may establish a non-IP connection between UE 110 and WAN 140. Furthermore, through an APN, access network 120 may enable UE 110 to communicate with FOTA server 150 via WAN 140.

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a Fifth Generation (5G) access network or other advanced network that includes functionality such as 5G new radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UEs 110. For example, base station 130-A may service UEs 110-A and 110-B, and base station 130-N may service UE 110-N. Base station 130 may include a 5G base station (e.g., a next generation node B (gNodeB)) that includes one or more radio frequency (RF) transceivers (also referred to as "cells" and/or "base station sectors") facing particular directions. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UEs 110 and may simultaneously generate up to k antenna beams. A particular antenna beam may service multiple UEs 110. In some implementations, base station 130 may also include a 4G base station (e.g., an evolved NodeB (eNodeB)).

WAN 140 may include any type of wide area network, a metropolitan area network (MAN), an optical network, a video network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of WAN 140 may be managed by a provider of communication services that also manages access network 120 and/or UEs 110. WAN 140 may allow the delivery of IP and/or non-IP services to/from UE 110, and may interface with other external networks. WAN 140 may include one or more server devices and/or network devices, or other types of computation or communication devices. In some implementations, WAN 140 may include an IP Multimedia Sub-system (IMS) network (not shown in FIG. 1). An IMS network may include a network for delivering IP multimedia services and may provide media flows between UE 110 and external IP networks or external circuit-switched networks (not shown in FIG. 1).

FOTA server 150 may include one or more devices, such as computer devices, databases, and/or server devices, that facilitate providing firmware updates to UEs 110. FOTA server 150 may be affiliated with the OEM or another type of entity that decides when to add a new functionality to, fix a potential security flaw in UEs 110, update firmware, etc. Additionally, FOTA server 150 may be affiliated with a network of a communication services provider. For example, the firmware may be pushed to the communication services provider for deployment to UEs 110 within a time frame or at a scheduled time. FOTA server 150 may facilitate providing firmware updates to UEs 110 by providing the updates via access network 120 and base station 130.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
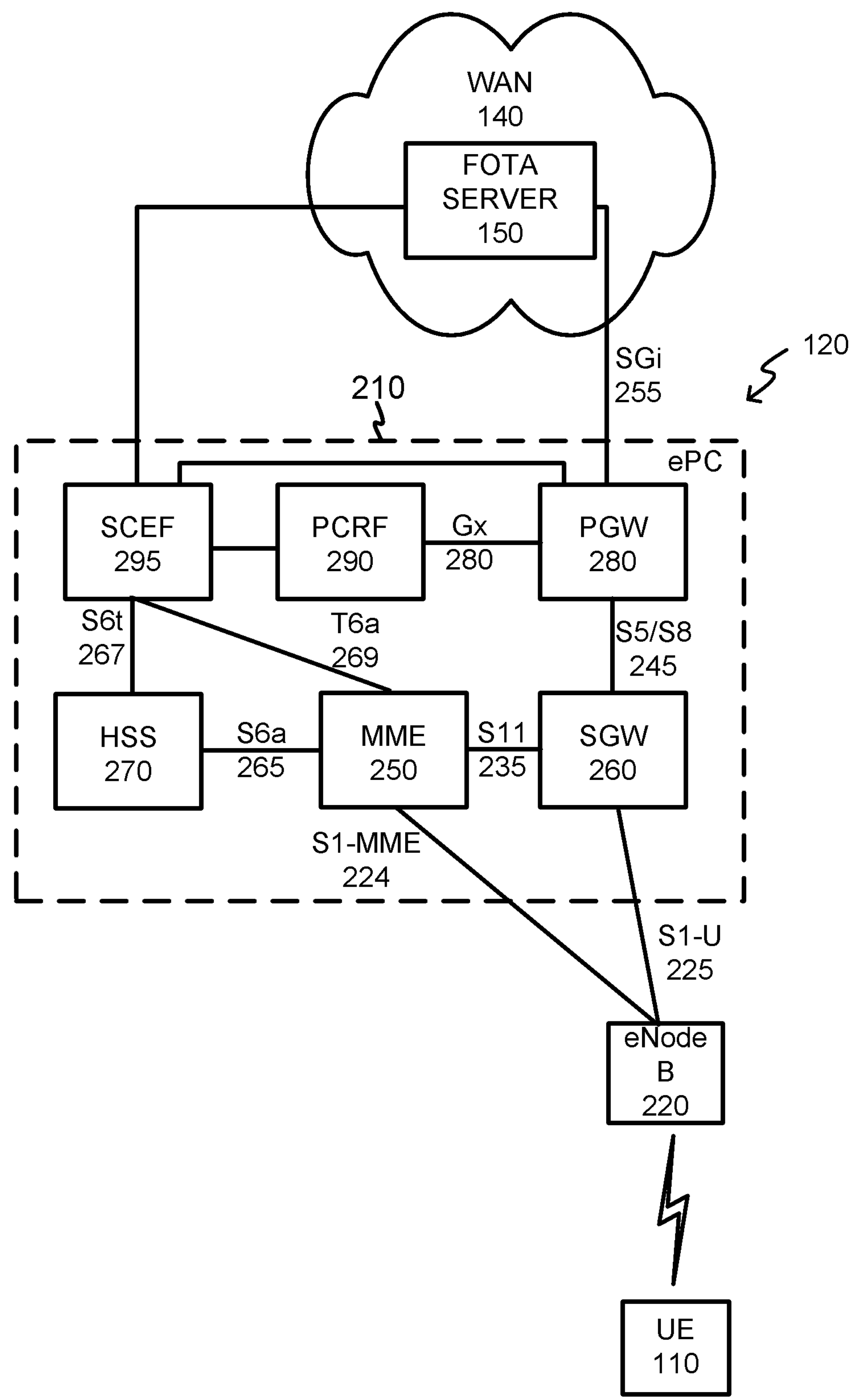
FIG. 2 is a block diagram of an exemplary system having an access network based on an LTE standard.

FIG. 2 is a block diagram of an exemplary networking system 200 including access network 120 based on the LTE standard. Access network 120 may include an LTE network with an evolved Packet Core (ePC) 210 and eNodeB 220 (corresponding, for example, to base station 130). UE 110 and eNodeB 220 may exchange data over a radio access technology (RAT) based on LTE air channel interface protocols. In the embodiment shown in FIG. 2, ePC 210 may operate in conjunction with an evolved Universal Mobile Telecommunications System (UMTS) Terrestrial Network (eUTRAN) that includes at least one eNodeB 220. Networking system 200 may further include an Internet Protocol (IP) network and/or a non-IP network, which may be embodied separately or included in a backhaul network (not shown) and/or in WAN 140. As shown in FIG. 2, FOTA server 150 may be connected to WAN 140 over a wired or wireless connection, using, for example, transmission control protocol/internet protocol (TCP/IP) and/or using a non-IP based protocol.

EPC 210 may include one or more devices that are physical and/or logical entities interconnected via standardized interfaces. EPC 210 may provide wireless packet-switched services and wireless packet connectivity to user devices to provide, for example, data, voice, and/or multimedia services. EPC 210 may further include a MME 250, a serving gateway (SGW) 260, a home subscriber server (HSS) 270, a packet data network gateway (PGW) 280, a Policy and Charging Rules Function (PCRF) 290, and a Service Capability Exposure Function (SCEF) 295. It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 may include one or more devices and other components having functionality that allows UE 110 to wirelessly connect via the RAT of eNodeB 220. ENodeB 220 may interface with ePC 210 via a S1 interface, which may be split into a control plane S1-MME interface 224 and a data plane S1-U interface 225. EnodeB 220 may interface with MME 250 via S1-MME interface 224, and interface with SGW 260 via S1-U interface 225. S1-U interface 226 may be implemented, for example, using general packet radio service (GPRS) Tunnelling Protocol (GTP). S1-MME interface 224 may be implemented, for example, with a protocol stack that includes a Non-Access Stratum (NAS) protocol and/or Stream Control Transmission Protocol (SCTP).

MME 250 may implement control plane processing for both the primary access network and the secondary access network. For example, through eNodeB 220, MME 250 may activate and deactivate bearers for UE 110 and may facilitate setting up a FOTA session. MME 250 may also select a particular SGW 260 for a particular UE 110. MME 250 may interface with other MMES (not shown) in ePC 210 and may send and receive information associated with UEs 110, which may allow one MME 250 to take over control plane processing of UEs serviced by another MME 250, if the other MME becomes unavailable.

SGW 260 may provide an access point to and from UE 110, may handle forwarding of data packets for UE 110, and may act as a local anchor point during handover procedures between eNodeBs 220. SGW 260 may interface with PGW 280 through an S5/S8 interface 245. S5/S8 interface 245 may be implemented, for example, using GTP.

PGW 280 may function as a gateway to WAN 140 through a SGi interface 255. WAN 140 may provide various services (e.g., firmware updates, over the top voice services, etc.) to UE 110. A particular UE 110, while connected to a single SGW 260, may be connected to multiple PGWs 280, one for each packet network with which UE 110 communicates.

Alternatively, UE 110 may exchange data with WAN 140 though a WiFi wireless access point (WAP) (not shown). The WiFi WAP may be part of a local area network, and access WAN 140 through a wired connection via a router. Alternatively, the WiFi WAP may be part of a mesh network (e.g., IEEE 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular UE 110. S11 interface 235 may be activated when MME 250 needs to communicate with SGW 260, such as when the particular UE 110 attaches to ePC 210, when bearers need to be added or modified for an existing session for the particular UE 110, when a connection to a new PGW 280 needs to be created, or during a handover procedure (e.g., when the particular UE 110 needs to switch to a different SGW 260).

HSS 270 may store information associated with UE 110 and/or information associated with users of UE 110. For example, HSS 270 may store user profiles that include registration, authentication, and access authorization information. HSS 270 may additionally store information about UE 110, such as whether UE 110 is capable of switching from NB-IoT mode to CAT-M1 mode. MME 250 may communicate with HSS 270 through an S6a interface 265. S6a interface 265 may be implemented, for example, using a Diameter protocol.

PCRF 290 may provide policy control decision and flow based charging control functionalities. PCRF 290 may provide network control regarding service data flow detection, gating, quality of service (QoS) and flow based charging, etc. PCRF 290 may determine how a certain service data flow shall be treated, and may ensure that user plane traffic mapping and treatment is in accordance with a user's subscription profile based, for example, on a specified QoS class identifier (QCI). PCRF 290 may communicate with PGW 280 using a Gx interface 280. Gx interface 280 may be implemented, for example, using a Diameter protocol.

SCEF 295 may include a network or computational device that provides exposure of 3GPP network service capabilities to third party applications. Specifically, SCEF 295 may provide network events through application programming interfaces (APIs) to external applications which may reside on FOTA server 150 and/or UEs 110. Exposure of the various events may include, for example: UE 110 reachability; UE 110 loss of connectivity; UE 110 location reporting; UE 110 roaming status; communication failure; and change of international mobile equipment identifier—international mobile subscriber identifier (IMEI-IMSI) association. SCEF 295 may facilitate NIDD services through a non-IP packet data network (PDN) established through SCEF 295. In one implementation, SCEF 295 may exchange control plane signaling with MME 250 (via a T6a interface 269 using Diameter protocol) and/or HSS 270 (via an Sh or S6t interface 267). In one implementation, SCEF 295 may be included as part of a control plane bearer path between UE device 110 and FOTA server 150. According to an implementation described herein, SCEF 295 may act as a gateway for connecting UE 110 to FOTA server 150. Generally, SCEF 295 may expose application-programming interfaces (APIs) for multiple application servers (such as FOTA server 150) to access network services to communicate with UEs 110. SCEF 295 may communicate with MME 250 via a modified T6a interface relative to a standardized T6a interface. SCEF 295 may act as an agent for performing a FOTA update for UE 110. Alternatively, SCEF 195 may facilitate setting up a FOTA session to allow FOTA server 150 to perform the FOTA update for UE 110.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
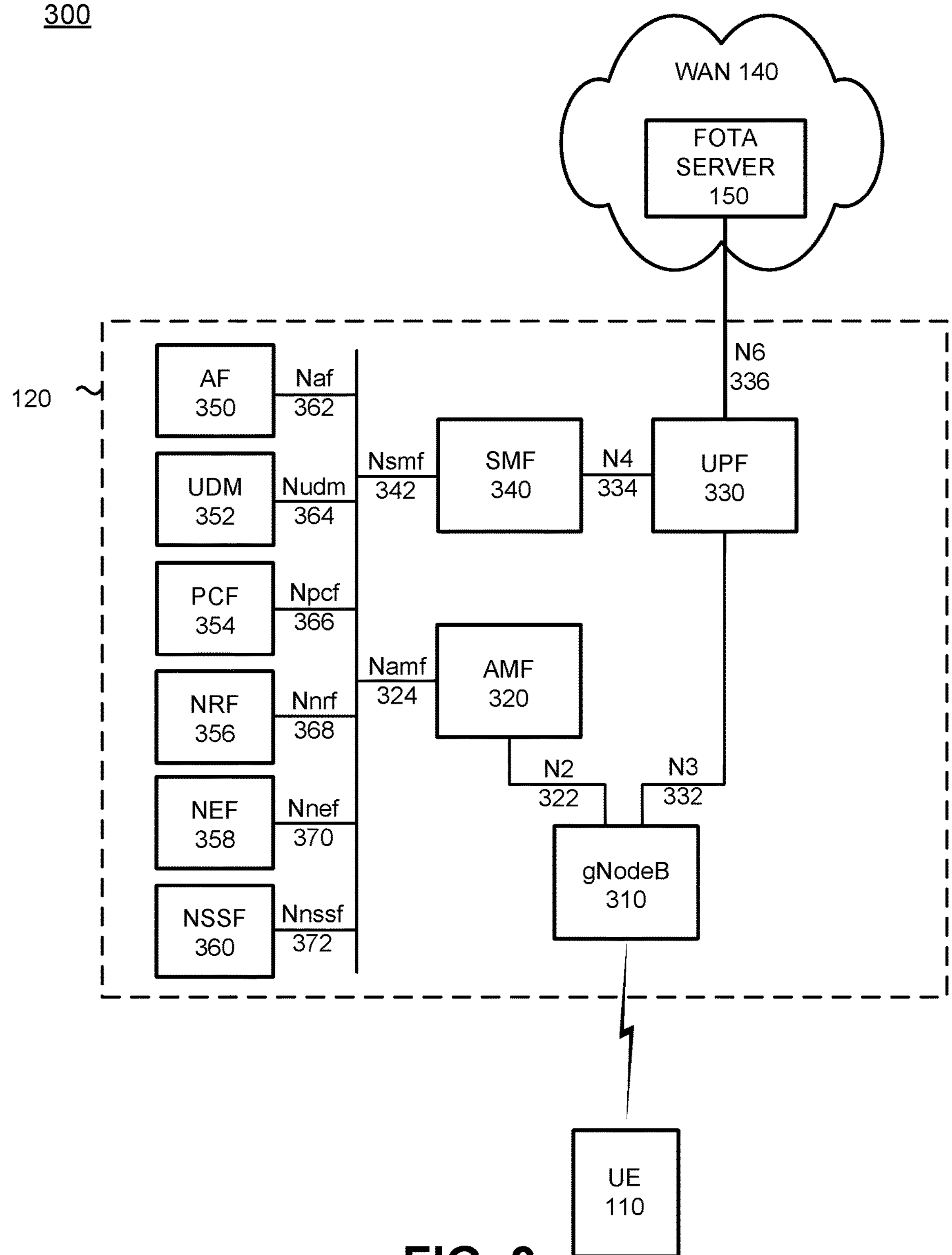
FIG. 3 is a block diagram of an exemplary system having an access network based on a 5G standard.

FIG. 3 is a block diagram of an exemplary system 300 having an access network 120 based on a 5G standard. As shown in FIG. 3, system 300 may include UE 110, access network 120, WAN 140, and FOTA server 150.

Access network 120 may include a gNodeB 310 (corresponding to base station 130), an Access and Mobility Management Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, a Network Exposure Function (NEF) 358, and a Network Slice Selection Function (NSSF) 360. While FIG. 3 depicts a single gNodeB 310, AMF 320, UPF 330, SMF 340, AF 350, UDM 352, PCF 354, NRF 356, NEF 358, and/or NSSF 360 for exemplary illustration purposes, in practice, FIG. 3 may include multiple gNodeBs 310, AMFs 320, UPFs 330, SMFs 340, AFs 350, UDMs 352, PCFs 354, NRFs 356, NEFs 358, and NSSFs 360.

gNodeB 310 may include one or more devices (e.g., base stations) and other components and functionality that enable UE 110 to wirelessly connect to access network 120 using 5G NR Radio Access Technology (RAT). For example, gNodeB 310 may include one or more cells, with each cell including a wireless transceiver with an antenna array configured for millimeter-wave wireless communication. gNodeB 310 may implement one or more RAN slices to partition access network 120. gNodeB 310 may communicate with AMF 320 using an N2 interface 322 and communicate with UPF 330 using an N3 interface 332.

AMF 320 may perform registration management, connection management, reachability management, mobility management, lawful intercepts, Short Message Service (SMS) transport between UE 110 and an SMS function (not shown in FIG. 3), session management messages transport between UE 110 and SMF 340, access authentication and authorization, location services management, functionality to support non-3GPP access networks, and/or other types of management processes. In some implementations, AMF 320 may implement some or all of the functionality of managing RAN slices in gNodeB 310. AMF 320 may be accessible by other function nodes via a Namf interface 324.

UPF 330 may maintain an anchor point for intra/inter-RAT mobility, maintain an external Packet Data Unit (PDU) point of interconnect to a data network (e.g., WAN 140), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to WAN 140 using an N6 interface 336.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, accessing NEF 358, interacting with a policy framework for policy control, and/or other types of applications. AF 350 may be accessible via a Naf interface 362.

UDM 352 may maintain subscription information for UE 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data.

PCF 354 may support policies to control network behavior, provide policy rules to control plane functions (e.g., to SMF 340), access subscription information relevant to policy decisions, execute policy decisions, and/or perform other types of processes associated with policy enforcement. PCF 354 may be accessible via Npcf interface 366. PCF 354 may specify QoS policies based on QoS flow identity (QFI) consistent with 5G network standards.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

NEF 358 may expose capabilities, events, and/or status to other NFs, including third party NFs, AFs, edge computing NFs, and/or other types of NFs. For example, NEF 358 may provide capabilities and events/status of UE 110 to FOTA server 150. Furthermore, NEF 358 may secure provisioning of information from external applications to access network 120, translate information between access network 120 and devices/networks external to access network 120, support a Packet Flow Description (PFD) function, and/or perform other types of network exposure functions. NEF 358 may be accessible via Nnef interface 370. NEF 358 may act as an agent for performing a FOTA update for UE 110. Alternatively, NEF 358 may facilitate setting up a FOTA session to allow FOTA server 150 to perform the FOTA update for UE 110.

NSSF 360 may select a set of network slice instances to serve a particular UE 110, determine network slice selection assistance information (NSSAI), determine a particular AMF 320 to serve a particular UE 110, and/or perform other types of processes associated with network slice selection or management. In some implementations, NSSF 360 may implement some or all of the functionality of managing RAN slices in gNodeB 310. NSSF 360 may be accessible via Nnssf interface 372.

Although FIG. 3 shows exemplary components of access network 120, in other implementations, access network 120 may include fewer components, different components, differently arranged components, or additional components than depicted in FIG. 3. Additionally or alternatively, one or more components of access network 120 may perform functions described as being performed by one or more other components of access network 120. For example, access network 120 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, access network 120 may include a reference point architecture that includes point-to-point interfaces between particular function nodes.

Figure 4:
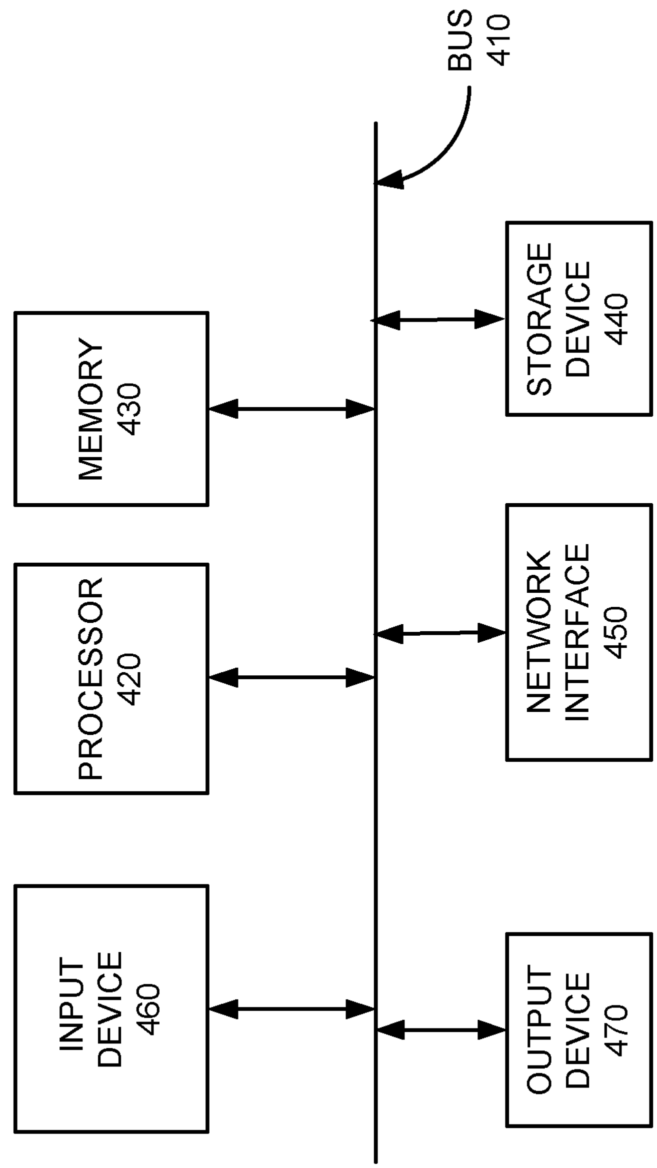
FIG. 4 is a block diagram showing exemplary components of a network device according to an embodiment.

FIG. 4 is a block diagram showing exemplary components of a network device 400 according to an embodiment. Network device 400 may include one or more network elements illustrated in FIG. 2 and/or FIG. 3, such as, for example, UE 110, FOTA server 150, MME 250, AMF 320, HSS 270, UDM 352, SCEF 295, and/or NEF 358, etc. In some embodiments, there may be a plurality of network devices 400 providing functionality of one or more network elements. Alternatively, once network device 400 may perform the functionality of any plurality of network elements. Network device 400 may include a bus 410, a processor 420, a memory 430, storage device 440, a network interface 450, input device 460, and an output device 470.

Bus 410 provides a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 CPU, and may use any operating system, which may include varieties of the Windows, UNIX, and/or Linux operating systems. Processor 420 may also use high-level analysis software packages and/or custom software written in any programming and/or scripting languages for interacting with other network entities are communicatively coupled to WAN 140.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with UEs 110.

Network interface 450 may include a transceiver that enables network device 400 to communicate with other devices and/or systems in network environment 100. Network interface 450 may be configured to exchange data with WAN 140 over wired communications (e.g., conductive wire, twisted pair cable, coaxial cable, transmission line, fiber optic cable, and/or waveguide, etc.), or a combination of wireless. In other embodiments, network interface 450 may interface with wide area network 140 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, network device 400 may perform certain operations relating to communicating from FOTA server 150 to UEs 110. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the signal flows in FIGS. 5 and 6 and the flow chart shown in FIG. 7.

Although FIG. 4 shows exemplary components of network device 400, in other implementations, network device 400 may include fewer components, different components, additional components, or differently arranged components than depicted in FIG. 4.

Figure 5:
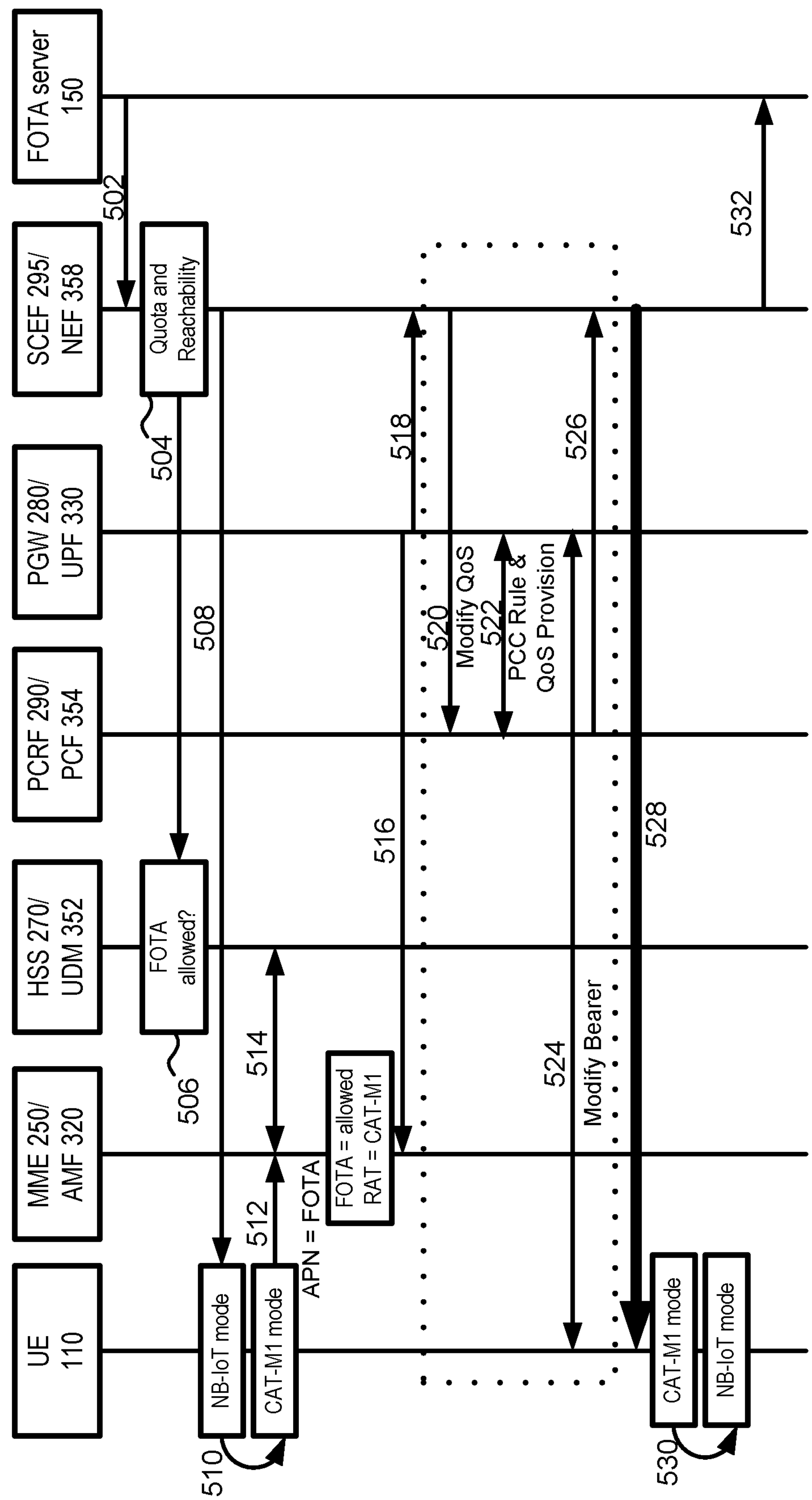
FIG. 5 is a diagram showing exemplary message flows within a networking system for performing a Firmware-Over-the-Air (FOTA) update.

FIG. 5 is a diagram illustrating exemplary communications between devices in network environment 100. Communications in FIG. 5 represent communications for performing a FOTA update with SCEF 295 acting as an agent for a customer providing the FOTA update. The message flow diagrams show network components which may correspond to both LTE and 5G network standards. The LTE components are shown with the label "2XX" and the 5G components are shown with the label "3XX." For example, as shown in FIG. 5, the base station elements are shown as "eNode 220/gNode 310," the mobility managers are shown as "MME 250/AMF 320," etc.

Referring to FIG. 5, a customer may request a firmware update for UEs 110. FOTA server 150 may send a FOTA request to SCEF 295/NEF 358 (502). FOTA server 150 may issue an application programming interface (API) call with a firmware image containing the firmware update or update and a list of UEs 110 on which to install the firmware image. The FOTA request may indicate that the firmware update should be performed for UEs 110 in the list of UEs.

Continuing with FIG. 5, SCEF 295/NEF 358 may determine whether a firmware update quota has been reached for UEs 110 and whether UEs 110 are reachable (504). SCEF 295/NEF 358 may determine whether a FOTA quota has been reached for UEs 110 in the list of UEs. For example, the quota may be set by SCEF 295/NEF 358 and a customer associated with UE 110 may be given a quota for performing firmware updates for UE 110 based on the type of UE 110, the customer's service plan, etc. In one implementation, the customer may be allowed to perform the update a predetermined number of times in a time period. For example, the customer may be authorized to perform firmware updates for UEs 110 one or two times per month. As another example, the customer may be authorized to perform firmware updates for UEs 110 free of cost (e.g., data usage does not count against the customer's monthly data plan) one or two times a month. In one implementation, when the quota has been met, the customer may be charged for additional FOTA updates. In this implementation, when the quota has been met, the customer may be informed that the quota has been met and may be given the option to be billed for an additional firmware update based on the amount of data. In another implementation, the customer may not be able to perform additional FOTA updates until a next billing cycle.

SCEF 295/NEF 358 may additionally determine whether UEs 110 in the list of UEs are reachable. In order to save power, UEs 110 may be offline or "sleeping" for a percentage of the time. After UE 110 "wakes up," UE 110 may inform SCEF 295/NEF 358 that UE 110 will be reachable for a certain period of time (i.e., five minutes, ten minutes, etc.) and will be able to receive the firmware update during this time. SCEF 295/NEF 358 may monitor UEs 110 to determine whether UEs 110 are unreachable (i.e., offline or "sleeping") or reachable and able to receive the firmware update. In addition, SCEF 295/NEF 358 may determine for how long UEs 110 will be reachable to receive the firmware update.

A determination may be made whether UEs 110 are able to switch to CAT-M1 mode to receive the FOTA update. As shown in FIG. 5, HSS 270/UDM 352 may determine whether a FOTA flag is enabled for UEs 110 in the list of UEs (506). HSS 270/UDM 352 may determine whether a FOTA update is allowed for UEs 110. In one implementation, a flag may be enabled for UEs 110 when UEs 110 are able to switch from NB-IoT mode to CAT-M1 mode. The flag may be enabled during an initial provisioning of UE 110 or the flag may be dynamically updated after the provisioning based on processing logic within UE 110 (e.g., processor 420). In another implementation, the flag may be enabled for UEs 110 that operate in CAT-M1 mode for normal operations. In this implementation, a FOTA update may be performed for UEs 110 without switching a mode associated with UEs 110.

When the quota for UE 110 has not been reached, when UE 110 is reachable, and when the FOTA flag is enabled for UE 110, UE 110 may switch from NB-IoT mode to CAT-M1 mode. As shown in FIG. 5, SCEF 295/NEF 358 may send a command to UE 110 to switch from NB-IoT mode to CAT-M1 mode for performing the firmware update (508).

UE 110 may switch from NB-IoT mode to CAT-M1 mode in response to receiving the command from SCEF 295/NEF 358 (510). UE 110 may further switch the access point name (APN) type to FOTA in order to create a network connection dedicated to the FOTA update (512).

MME 250/AMF 320 may retrieve subscription data associated with UE 110 from HSS 270/UDM 352 to verify that the FOTA update is allowed for UE 110 (514). MME 250/AMF 320 may additionally verify that a radio access technology (RAT) type associated with UE 110 is CAT-M1. In this way, MME 250/AMF 320 may verify that all of the necessary properties and provisioning are in place for performing the FOTA update for UE 110.

Continuing with FIG. 5, a connection may be set up with PGW 280/UPF 330 in order to set up a user plane for performing the FOTA update (516). In response to the connection being established, PGW 280/UPF 330 may notify SCEF 295/NEF 358 of a communication (e.g., PDN) session (518). For example, PGW 280/UPF 330 may send SCEF 295/NEF 358 user plane information, such as session IP information and the IP address of PGW 280/UPF 330.

Continuing with FIG. 5, the QoS associated with the session may be modified. When SCEF 295/NEF 358 receives the session IP information, SCEF 295/NEF 358 may send a command to PCRF 290/PCF 354 to modify the QoS associated with the session (520). SCEF 295/NEF 358 may additionally send PCRF 290/PCF 354 information associated with the PDN session, a new aggregate maximum bit rate (AMBR) associated with the PDN session, and allocation and retention priority (ARP) information associated with the PDN session. Because the FOTA update may use a large amount of resources associated with base station eNodeB 220/gNodeB 310, increasing a priority and a bandwidth associated with the FOTA update may ensure that the FOTA update is successful.

PCRF 290/PCF 354 may send a policy and charging control (PCC) rule and QoS provision command to PGW 280/UPF 330 in order to update the QoS associated with the PDN session (522). The PCC rule and QoS provision command may include information associated with the PDN session as well as the AMBR and ARP associated with the session. In response, PGW 280/UPF 330 may modify the bearer QoS associated with the session based on the received parameters (524). PCRF 290/PCF 354 may send SCEF 295/NEF 358 a response indicating that the QoS has been updated for the FOTA session (526).

When the QoS has been modified, the FOTA update may be performed. SCEF 295/NEF 358 may transmit the firmware image containing the firmware update to UE 110 to update the firmware associated with UE 110 (528). When the transmission is complete and the firmware has been updated, UE 110 may switch back to NB-IoT mode and a confirmation may be sent confirming that the FOTA update has been completed. As shown in FIG. 5, SCEF 295/NEF 358 may send a command to UE 110 to switch back to NB-IoT mode when the FOTA update has been completed (530). Additionally, SCEF 295/NEF 358 may inform FOTA server 150 that the firmware update has been completed (532).

The processing associated with FIG. 5 may ensure a successful FOTA update of UE 110 by switching UE 110 from NB-IoT mode to a higher bandwidth CAT-M1 mode for the FOTA update. In addition, a QoS associated with the FOTA update session may be modified in order to ensure completion of the FOTA update session when there is competition for resources associated with eNodeB 220/gNodeB 310. Since SCEF 295/NEF 358 controls the FOTA update session, this may ensure that UE 110 uses the CAT-M1 mode only for the FOTA update and that UE 110 switches back to NB-IoT mode for normal operations. Additionally, the processing of FIG. 5 may be performed with respect to CAT-M1 devices by generating a FOTA update session and increasing the QoS associated with a FOTA update session without switching a mode associated with the CAT-M1 device.

Figure 6:
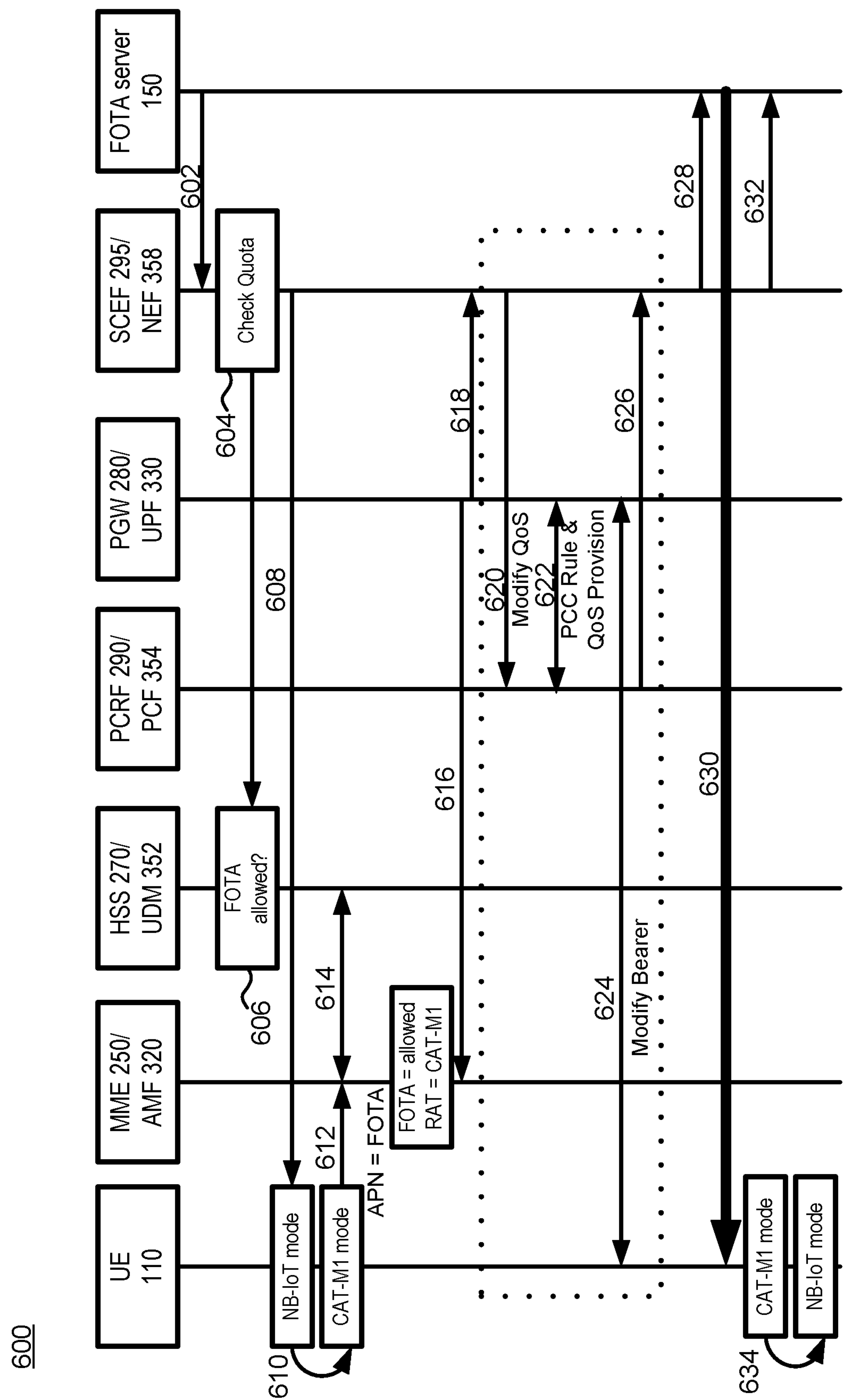
FIG. 6 is a diagram showing exemplary message flows within a networking system for setting up a session for performing a FOTA update.

FIG. 6 is a diagram illustrating exemplary communications between devices in network environment 100. Communications in FIG. 6 represent communications for performing a FOTA update with a customer interacting with UE 110 for performing the FOTA update. As with FIG. 5, the message flow diagram in FIG. 6 shows network components which may correspond both LTE and 5G network standards.

Referring to FIG. 6, a customer may request a firmware update for UE 110. FOTA server 150 may receive the request and send a FOTA request to SCEF 295/NEF 358 with a firmware image with the firmware update and an identifier of UE 110 (602). The identifier may include an IP address, a telephone number, an international mobile equipment identity (IMEI) number, or another type of identifier. The FOTA request may request a session for performing a firmware update on UE 110.

Continuing with FIG. 6, SCEF 295/NEF 358 may determine whether a firmware update quota has been reached for UE 110 (604). Additionally, a determination may be made whether UE 110 is able to switch to CAT-M1 mode to receive the FOTA update. As shown in FIG. 6, HSS 270/UDM 352 may determine whether a FOTA flag is enabled for UE 110 (606). If UE 110 is a CAT-M1 device, the FOTA flag may be enabled for UE 110 and the FOTA update may be completed without UE 110 switching modes.

When the quota for UE 110 has not been reached and when the FOTA flag is enabled for UE 110, UE 110 may switch from NB-IoT mode to CAT-M1 mode. As shown in FIG. 6, SCEF 295/NEF 358 may send a command to UE 110 to switch from NB-IoT mode to CAT-M1 mode for performing the firmware update (608). UE 110 may switch from NB-IoT mode to CAT-M1 mode in response to receiving the command from SCEF 295/NEF 358 (610). UE 110 may further switch the access point name (APN) type to FOTA in order to create a network connection dedicated to the FOTA update session (612).

MME 250/AMF 320 may retrieve subscription data associated with UE 110 from HSS 270/UDM 352 to verify that the FOTA update is allowed for UE 110 (614). MME 250/AMF 320 may additionally verify that the RAT type associated with UE 110 is CAT-M1. In this way, MME 250/AMF 320 may verify that all of the necessary properties and provisioning are in place for creating a session for performing the FOTA update for UE 110.

Continuing with FIG. 6, a connection may be established with PGW 280/UPF 330 to set up a communication session for performing the FOTA update (616). In response to the connection being established, PGW 280/UPF 330 may notify SCEF 295/NEF 358 of the communication session for UE 110 (618). Similar to the steps described with respect to FIG. 5, the QoS associated with the session may be modified. As shown in FIG. 6, when SCEF 295/NEF 358 receives the session IP information, SCEF 295/NEF 358 may send a command to PCRF 290/PCF 354 to modify the QoS associated with the session (620).

PCRF 290/PCF 354 may send a PCC rule and QoS provision command to PGW 280/UPF 330 to update the QoS associated with the FOTA session (622). In response, PGW 280/UPF 330 may modify the bearer QoS associated with the session based on the received parameters (624).

PCRF 290/PCF 354 may send SCEF 295/NEF 358 a response indicating that the QoS has been updated for the FOTA session (626).

When the QoS has been modified, the FOTA update session may be granted. SCEF 295/NEF 358 may transmit an indication that the session has been granted along with an identifier of UE 110 to FOTA server 150 (628). When the session has been granted, FOTA server 150 may perform the FOTA update for UE 110 (630). In order to ensure that the session is used only for the FOTA update, after the session has timed out, SCEF 295/NEF 358 may send an indication to FOTA server 150 that the FOTA session has timed out and the FOTA update is complete (632). In one implementation, the session may time out after a period of time has elapsed. In another implementation, the session may time out after a volume of data has been transmitted. Alternatively, after the FOTA update has been completed, FOTA server 150 may inform SCEF 295/NEF 358 that the FOTA update is complete and the session may be disconnected or terminated.

When the transmission is complete and the firmware has been updated, UE 110 may switch back to NB-IoT mode. As shown in FIG. 6, SCEF 295/NEF 358 may send a command to UE 110 to switch back to NB-IoT mode when the FOTA update has been completed (634).

The steps associated with FIG. 6 may ensure a successful FOTA update of UE 110 by switching UE 110 from NB-IoT mode to a higher bandwidth CAT-M1 mode for the FOTA update. In addition, a QoS associated with the FOTA update session may be modified in order to ensure completion of the FOTA update session when there is competition for resources associated with base station 130. Although the customer may control the FOTA update session, the processing described above ensures that UE 110 uses the CAT-M1 mode only for the FOTA update by limiting the FOTA session based on time and/or volume of data.

Figure 7:
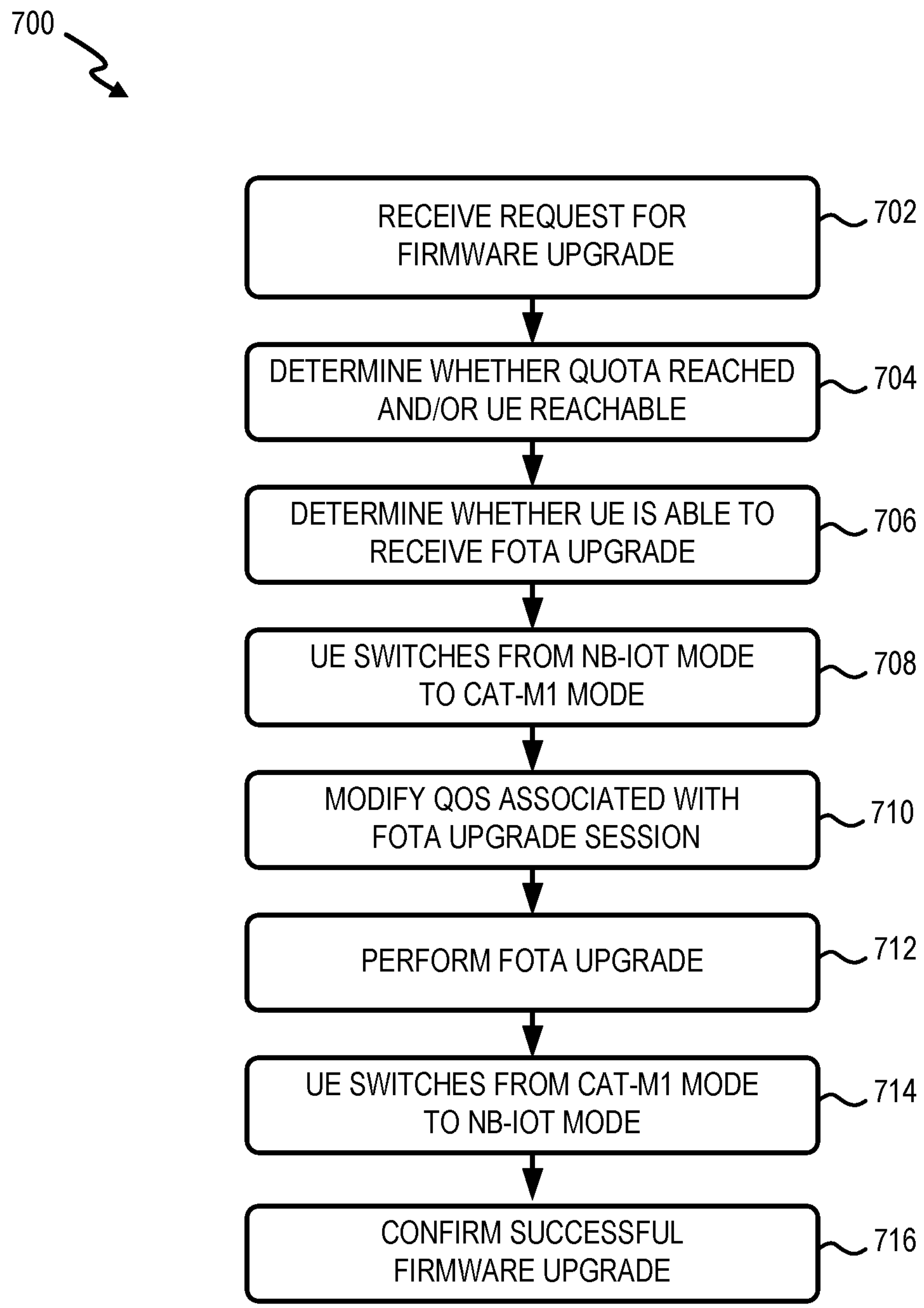
FIG. 7 is a flowchart of a process for performing a FOTA update.

FIG. 7 is a flow diagram illustrating an exemplary process 700 for performing a FOTA update. In one implementation, process 700 may be performed with SCEF 295/NEF 358 interacting with UE 110 to perform the FOTA update. In another implementation, process 700 may be performed with a customer interacting directly with UE 110 to perform the FOTA update.

Process 700 may begin by receiving a customer request for a firmware update for UE 110 (block 702). For example, SCEF 295/NEF 358 may receive a request from the customer and via FOTA server 150 to perform a FOTA update for UE 110 or an owner associated with multiple UEs 110. The customer may include a user of UE 110. Alternatively, the customer may include a manufacturer of UE 110 or another type of entity. Continuing with FIG. 7, it may be determined whether a firmware update quota has been reached for UEs 110 and/or whether UEs 110 are reachable (block 704). For example, SCEF 295/NEF 358 may determine whether the customer or UE 110 has reached a quota for a number of FOTA updates in a particular period of time. In addition, SCEF 295/NEF 358 may determine whether UE 110 is reachable for receiving the FOTA update.

Process 700 may continue by determining whether UE 110 is able to receive the FOTA update (block 706). Particular UEs 110 may be unable to switch from NB-IOT mode to CAT-M1 mode in order to receive the FOTA update. HSS 270/UDM 352 may determine whether UE 110 is able to switch to CAT-M1 mode in order to receive the FOTA update. In another implementation, HSS 270/UDM 352 may determine that UE 110 operates in CAT-M1 and is able to receive the FOTA update without switching modes. In this implementation, a FOTA update session may be generated and a QoS associated with the session may be boosted without switching modes.

Process 700 may continue when UE 110 switches from NB-IoT mode to CAT-M1 mode (block 708). When it has been determined that the quota has not been reached, UE 110 is reachable, and UE 110 is able to switch modes, SCEF 295/NEF 358 may send a command to UE 110 to switch modes from NB-IoT mode to CAT-M1 mode in preparation for receiving the FOTA update. Because CAT-M1 mode has a higher bandwidth than NB-IoT mode, it may be beneficial to perform the FOTA update when UE 110 is in CAT-M1 mode.

Process 700 may continue by modifying a QoS associated with the FOTA update session (block 710). Because many devices may be competing for resources associated with a base station (e.g., eNodeB 220, gNodeB 310), increasing the QoS associated with the FOTA update session may ensure that the FOTA update is successfully completed. In addition, a priority associated with the FOTA update session may be increased to ensure that the FOTA update is successful.

When the QoS associated with the FOTA update session has been modified, the FOTA update may be performed (block 712). In one implementation, SCEF 295/NEF 358 may send a firmware image containing the firmware update for the FOTA update to UE 110 to perform the FOTA update. In another implementation, the customer may connect to UE 110 to perform the FOTA update.

When the FOTA update has been completed, UE 110 may switch from CAT-M1 mode to NB-IoT mode (block 714). In one implementation, when the FOTA update has been completed, SCEF 295/NEF 358 may instruct UE 110 to switch to NB-IoT mode and to resume normal operations. In another implementation, when a session time from the start of the FOTA update session has been reached, UE 110 may switch to NB-IoT mode and resume normal operations. Alternatively, after a volume of data has been transmitted during the FOTA update session, it may be assumed that the FOTA update has been completed and UE 110 may switch back to NB-IoT mode. In addition, when the FOTA update has been completed, UE 110 may indicate that the FOTA update has been successful and UE 110 may switch to NB-IoT mode.

When the FOTA update has been successfully completed and UE 110 has switched back to narrow band mode, a confirmation may be sent to the customer (block 716). If UE 110 operates in CAT-M1 mode, the confirmation may be sent without UE 110 switching modes.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signal flows has been described with respect to FIGS. 5 and 6, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms “comprises”/“comprising” when used in this specification are taken to specify the presence of stated features, integers, steps or components but does not preclude the presence or addition of one or more other features, integers, steps, components or groups thereof.

The term “logic,” as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term “substantially” is utilized herein to represent the inherent degree of uncertainty that may be attributed to any quantitative comparison, value, measurement, or other representation. The term “substantially” is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known “opt-in” or “opt-out” processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article “a” is intended to include one or more items. Further, the phrase “based on” is intended to mean “based, at least in part, on” unless explicitly stated otherwise.

What is claimed is:

1. A method comprising:

receiving a request to perform a firmware update on an Internet of Things (IOT) device;

determining whether a quota for performing firmware updates for the IoT device has been reached;

determining whether the IoT device is capable of switching from a narrow band IoT (NB-IoT) mode to a Category M1 (CAT-M1) mode, wherein the IoT device sends and receives data via first channels when the IoT device is operating in the NB-IOT mode, and wherein the IoT device sends and receives data via second channels when the IoT device is operating in the CAT-M1 mode;

instructing the IoT device to switch to the CAT-M1 mode in response to determining that the IoT device is capable of switching to the CAT-M1 mode;

initiating a firmware update session;

increasing a quality of service (QOS) associated with the firmware update session;

increasing the priority associated with the firmware update session;

sending the firmware update, during the firmware update session, to the IoT device while the IoT device is in the CAT-M1 mode;

performing the firmware update without counting data usage for the firmware update against a data plan of a user associated with the IoT device, when the quota for performing firmware updates for the IoT device has not been reached;

determining that the firmware update has been completed; and instructing the IoT device to switch from the CAT-M1 mode to the NB-IOT mode when the firmware update has been completed.

2. The method of claim 1, wherein the first channels include NB-IoT channels, and wherein the second channels include CAT-M1 channels.

3. The method of claim 1, wherein the firmware update includes a firmware Over-the-Air (FOTA) update.

4. The method of claim 1, wherein increasing the QoS associated with the firmware update session comprises:

sending, to one of a policy and charging rules function (PCRF) or a policy control function (PCF), a command to modify the QoS for the firmware update session.

5. The method of claim 1, further comprising:

determining when the IoT device will be reachable; and performing the firmware update while the IoT device is reachable.

6. The method of claim 1, wherein the second channels have a higher bandwidth than the first channels.

7. A system comprising:

a memory to store instructions; and one or more processors configured to execute the instructions to:

receive a request to perform a firmware update on an Internet of Things (IOT) device;

determine whether a quota for performing firmware updates for the IoT device has been reached;

determine whether the IoT device is capable of switching from a narrow band IoT (NB-IOT) mode to a Category M1 (CAT-M1) mode, wherein the IoT device sends and receives data via first channels when the IoT device is operating in the NB-IOT mode, and wherein the IOT device sends and receives data via second channels when the IoT device is operating in the CAT-M1 mode;

instruct the IoT device to switch to the CAT-M1 mode in response to determining that the IoT device is capable of switching to the CAT-M1 mode;

initiate a firmware update session;

increase a quality of service (QOS) associated with the firmware update session;

send the firmware update, during the firmware update session, to the IoT device while the IOT device is in the CAT-M1 mode;

perform the firmware update without counting data usage for the firmware update against a data plan of a user associated with the IoT device, when the quota for performing firmware updates for the IoT device has not been reached;

determine that the firmware update has been completed; and instruct the IoT device to switch from the CAT-M1 mode to the NB-IOT mode in response to determining that the firmware update has been completed.

8. The system of claim 7, wherein the first channels include NB-IoT channels, and wherein the second channels include CAT-M1 channels.

9. The system of claim 7, wherein the firmware update includes a firmware Over-the-Air (FOTA) update.

10. The system of claim 7, wherein, when increasing the QoS associated with the firmware update session, the one or more processors are configured to:

send, to one of a policy and charging rules function (PCRF) or a policy control function (PCF), a command to modify the QoS for the firmware update session.

11. The system of claim 7, wherein the one or more processors are further configured to execute the instructions to:

determine when the IOT device will be reachable; and perform the firmware update while the IoT device is reachable.

12. The system of claim 7, wherein the second channels have a higher bandwidth than the first channels.

13. The system of claim 7, wherein the one or more processors are further configured to:

increase the priority associated with the firmware update session.

14. A non-transitory computer-readable medium storing instructions, the instructions comprising:

one or more instructions that, when executed by a processor, cause the processor to:

receive a request to perform a firmware update on an Internet of Things (IOT) device;

determine whether a quota for performing firmware updates for the IoT device has been reached;

determine whether the IoT device is capable of switching from a narrow band IoT (NB-IOT) mode to a Category M1 (CAT-M1) mode, wherein the IoT device sends and receives data via first channels when the IoT device is operating in the NB-IOT mode, and wherein the IoT device sends and receives data via second channels when the IoT device is operating in the CAT-M1 mode;

instruct the IoT device to switch to the CAT-M1 mode in response to determining that the IoT device is capable of switching to the CAT-M1 mode;

initiate a firmware update session;

increase a quality of service (QOS) associated with the firmware update session;

send the firmware update, during the firmware update session, to the IoT device while the IoT device is in the CAT-M1 mode;

perform the firmware update without counting data usage for the firmware update against a data plan of a user associated with the IoT device, when the quota for performing firmware updates for the IoT device has not been reached;

determine that the firmware update has been completed; and instruct the IoT device to switch from the CAT-M1 mode to the NB-IOT mode when the firmware update has been completed.

15. The non-transitory computer-readable medium of claim 14, wherein the first channels include NB-IOT channels, and wherein the second channels include CAT-M1 channels.

16. The non-transitory computer-readable medium of claim 14, wherein the firmware update includes a firmware Over-the-Air (FOTA) update.

17. The non-transitory computer-readable medium of claim 14, wherein the one or more instructions that cause the processor to increase the QoS associated with the firmware update session, cause the processor to:

send, to one of a policy and charging rules function (PCRF) or policy control function (PCF), a command to modify the QoS for the firmware update session.

18. The non-transitory computer-readable medium of claim 14, wherein the instructions further comprise one or more instructions that cause the processor to:

determine when the IoT device will be reachable; and perform the firmware update while the IoT device is reachable.

19. The non-transitory computer-readable medium of claim 14, wherein the one or more instructions that, when executed by the processor, cause the processor to:

increase the priority associated with the firmware update session.

20. The non-transitory computer-readable medium of claim 14, wherein the second channels have a higher bandwidth than the first channels.

* * * * *